United States Patent [19]

Veelaert et al.

[11] Patent Number: 5,747,658
[45] Date of Patent: May 5, 1998

[54] METHOD FOR THE OXIDATION OF CARBOHYDRATES

[75] Inventors: Sarah Veelaert, Antwerp, Belgium; Dirk De Wit, Bennekom; Huibert Tournois, Rhenen, both of Netherlands

[73] Assignee: Instituut Voor Agrotechnologisch Onderzoek (ATO-DLO), Wageningen, Netherlands

[21] Appl. No.: 640,743

[22] PCT Filed: Nov. 4, 1994

[86] PCT No.: PCT/NL94/00272

§ 371 Date: Jun. 13, 1996

§ 102(e) Date: Jun. 13, 1996

[87] PCT Pub. No.: WO95/12619

PCT Pub. Date: May 11, 1995

[30] Foreign Application Priority Data

Nov. 4, 1993 [NL] Netherlands .................. 9301905

[51] Int. Cl.$^6$ .................. C08B 31/18; C08B 33/08; C08B 35/08
[52] U.S. Cl. .................. 536/18.5
[58] Field of Search .................. 536/18.5, 124, 536/123.1, 123.12, 105, 104

[56] References Cited

U.S. PATENT DOCUMENTS 2,648,629  8/1953  Dvonch et al. .................. 204/79
3,703,508  11/1972  Heit et al. .................. 260/212

FOREIGN PATENT DOCUMENTS 87778   11/1970  German Dem. Rep. .
87 778  11/1972  German Dem. Rep. .

OTHER PUBLICATIONS

Veelaert et al., "Structural and physico–chemical changes of potato starch along periodate oxidation," *Starch*, vol. 47: 263–268, 1995.

Van der Zee et al., "Structure–biodegradation relationships of polymeric materials I.—effect of degree of oxidation on biodegradability of carbohydrate polymers," *Journal of Environmental Polymer Degradation*, vol. 3: 235–242, 1995.

McGuire et al., "Chemical Process for Making Dialdehyde Starch", *Die Starke*, vol. 23, No. 2, Jan. 1971, pp. 42–45.

*The Carbohydrates—Chemistry, Biochemistry, Physiology*, (Academic Press Inc., New York), Ed. by Ward Pigman, pp. 346–352, (1957).

*Structural Carbohydrate Chemistry*, Ed. by E.G.V. Percival, (J. Garnet Miller Ltd., London), pp. 206–208, (1962).

*The Introduction to the Chemistry of Carbohydrates*, Ed. by Guthrie and Honeyman, (Clarendon Press, Oxford), pp. 72–76, (1964).

*Monosaccharides Their Chemistry and Their Roles in Natural Products*, Ed. by Collins & Ferrier, (John Wiley & Sons, New York), p. 4, (1995).

Primary Examiner—John Kight
Assistant Examiner—Howard C. Lee
Attorney, Agent, or Firm—Young & Thompson

[57] ABSTRACT

The invention provides a method for the oxidation of carbohydrates with periodate in an aqueous medium, with which method a less than equivalent amount of periodate is used and the periodate is regenerated during the reaction in a separate reaction chamber. The periodate is preferably regenerated electrochemically. The oxidation leads to dialdehyde carbohydrates in which advantageously 30–85% of the available diol groups are oxidized to dialdehyde groups.

11 Claims, 2 Drawing Sheets

METHOD FOR THE OXIDATION OF CARBOHYDRATES

The invention relates to a method for the oxidation of carbohydrates which possess two adjacent secondary alcohol functional groups, wherein a less than equivalent amount of periodate is used and the periodate is regenerated during the reaction.

The oxidation of carbohydrates of this type can lead to dialdehyde carbohydrates. The reactive aldehyde groups render dialdehyde compounds of this type suitable for many applications, for example as cross-linking agents for naturally occurring and synthetic polymers, mainly with the aim of an improvement in the sensitivity to moisture and the production of insoluble films and fibres. Thus, dialdehyde starch is used in the paper, leather and textile industry. It is also usable as an additive in glue, binding agents, coatings, photographic material, thickeners, cosmetics, plastics and the like. An application developed recently is that of carrier material for proteins, for example for use in diagnostics. Cationic dialdehyde starch is also used for the application in paper, in connection with the interaction of the positive (ammonium) groups with the negatively charged cellulose. Furthermore, dicarboxylic acid carbohydrates, which are suitable, inter alia, as calcium-complexing agents (substitutes for phosphate) can be obtained from dialdehyde carbohydrates by further oxidation.

It is known that carbohydrates can be oxidized to dialdehyde carbohydrates using periodic acid or periodate salts, lead(IV) salts or permanganate; the oxidation of inulin with periodate is described, for example, by Maekawa and Nakajima, *J. Agr. Chem. Soc. Japan* 28, 357–363 (1954) (see *Chem. Abs.* 10078c (1954)).

The oxidation of carbohydrates with periodate can be represented by the following equation, in which A denotes the residue of a mono-saccharide unit of the carbohydrate.

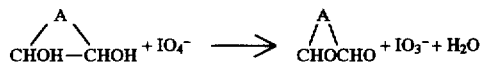

Instead of the metaperiodate $IO_4^-$ shown in the equation, usually in the form of $H_4IO_6^-$, and periodic acid, $H_5IO_6$, the oxidizing ion can also be paraperiodate $H_2IO_6^{3-}$.

U.S. Pat. No. 2,648,629 describes a method for the oxidation of polysaccharides by treatment with a catalytic amount (about 0.3 equivalent) of (per)iodic acid, wherein the iodic acid formed is continuously regenerated to periodic acid by means of an electric current passing through the cell which also contains the polysaccharide. Thus, both the oxidation of the polysaccharide and the regeneration of periodate occur in the same reaction chamber, i.e. the anode chamber. The dialdehyde content of the oxidized polysaccharide (starch) is 68–89%. This method is associated with contamination of both the polysaccharide by electrode metal and the electrode by organic material resulting in corrosion of the electrode coating.

U.S. Pat. No. 3,703,508 teaches a method for regenerating spent periodate resulting form the oxidation of polysaccharides, wherein the aqueous liquor containing the spent periodate is separated form the oxidized polysaccharide product, regenerated in a multi-chamber electrodialysis apparatus and then reused for oxidizing a next batch of polysaccharide. A disadvantage of this method is a high (equimolar) consumption of expensive periodate, which becomes very diluted after washing.

A method for the oxidation of starch using an excess of periodate, followed by separation of the reaction product and chemical regeneration of spent periodate using chlorine, was described by McGuire and Mehltretter in Die Stärke 23, 42–45 (1971). The dialdehyde content of the oxidized starch is 97%. This method leads to at least equivalent amounts of salts in the end product, which presents separation problems and/or restricts the possible uses of the products.

DD-A-87778 describes a method for the production of water-soluble dialdehyde polysaccharides using electrochemically generated periodate. The water-soluble polysaccharide (dextran) is oxidized with 0.2 equivalent of periodate in order to produce a product having a degree of oxidation of 10%; the reaction mixture is contacted with an ion exchange resin in acetate form in order to separate the product from the (per)iodate, and the resin is eluted with alkali and the recovered (per)iodate is purified and freed from acetate (resin product) and formate (reaction byproduct) by evaporation and then regenerated and reused. This method can only be used in case of water-soluble materials. The process cannot be performed continuously and at least an equimolar amount of periodate corresponding to the degree of oxidation has to be applied.

Thus, the known methods for the oxidation of carbohydrates to give dialdehyde carbohydrates, including that using periodate, all have disadvantages; said methods are associated with a high consumption of periodate or with high salt production or with contamination of the electrode or with restricted applicability or with long reaction times. Where regeneration of the spent periodate has already been considered, the methods proposed for this purpose are not very effective and, as a consequence of contamination by electrode metal, are unsatisfactory and expensive.

A method has now been found for the oxidation of carbohydrates with periodate in an aqueous medium which has a lower consumption of periodate per dialdehyde functional group formed, with which method, moreover, smaller amounts of salt are formed; the reaction times are also appreciably shorter.

The method according to the invention, wherein a less than equivalent amount of periodate is used and the periodate is regenerated during the reaction, is characterized in that the periodate is regenerated in a separate reaction chamber.

It has been found that in the oxidation of carbohydrates with periodate the reaction proceeds relatively rapidly at a low degree of conversion and is appreciably retarded at a high degree of conversion, that is to say when approximately half of the available glycol groups (groups of two adjacent secondary alcohol functional groups) have been converted to dialdehyde groups. On closer study, the reaction between carbohydrate and periodate is found to be a second order reaction at the start, which means that the rate of reaction is directly dependent on both the carbohydrate concentration and the periodate concentration. When an appreciable proportion, of the order of 50%, of the carbohydrate has been converted, the rate of reaction has become slower than may be anticipated on the basis of second order kinetics. Whereas a conversion of few tens of per cent is obtained in minutes, or at most a few hours, high degrees of conversion of, for example, more than 85%, require extremely long reaction times, of the order of many days.

Furthermore, it has been found that some properties of dialdehyde carbohydrates, such as the complexing properties and the reactivity, are no poorer when the percentage of dialdehyde groups is of the order of, for example, 50% instead of, for example, 90% of the theoretical maximum. It is assumed that (hemi-)acetal formation between a primary hydroxyl group and one or two aldehyde groups in a substantially oxidized carbohydrate plays a role here. Other properties, such as solubility in water, water absorption and biodegradability, are even found to be better in less completely oxidized carbohydrates. Moreover, recovery of iodate out of the reaction mixture during washing is easier in case of intermediate degrees of oxidation, such as from 40 to 60%.

Best results, both in respect of material consumption and reaction time and in respect of properties of the product of the method according to the invention, are obtained when the oxidation of the carbohydrate is continued until 0.05 to 0.85, especially 0.2 or even 0.3 to 0.85, in particular 0.3–0.65, more in particular 0.4 to 0.65, dialdehyde groups have been formed per original monosaccharide unit, that is to say with e.g. a degree of oxidation of 30–85% or 40–65%.

A less than equivalent amount of periodate is understood to be an amount of less than 1 mol periodate per monosaccharide unit. In particular, less than 0.75 mol periodate per monosaccharide unit, and preferably 0.02–0.5 and with particular preference 0.05–0.25 mol periodate per monosaccharide unit is used. With such low periodate/carbohydrate ratios the recovery of periodate after the reaction is simpler and less expensive (fewer washing steps) and relatively high carbohydrate concentrations can be used with, consequently, fewer undesirable side reactions. As a result of the simultaneous regeneration, a reasonable rate of reaction can be maintained despite the retardation of the oxidation towards the end of the reaction.

Suitable carbohydrates that can be oxidized to dialdehyde carbohydrates using the method according to the invention are, in principle, all disaccharides, oligosaccharides and polysaccharides which possess a glycol functional group, that is to say a vicinal dihydroxyl group, at least in one monosaccharide unit, but preferably in the majority of the monosaccharide units. Examples are glucans such as starch (mainly $\alpha$-1,4 bonds), cellulose (mainly $\beta$-1,4 bonds), glycogen and dextran (mainly $\alpha$-1,6 bonds), fructans such as inulin (mainly $\beta$-2,1 bonds) and levan (mainly 2,6 bonds), cell wall polysaccharides such as mannans, galactans, xylans and arabans, other pentosans, chitins as naturally occurring in crustaceae, fungi and green algae, pectic acid and pectins, and other gums and the like. Also useful are naturally occurring and synthetic analogues, fractions and derivatives thereof, including starch fraction such as amylose ($\alpha$-1,4 glucan) and amylopectin ($\alpha$-1,4 and $\alpha$-1,6 glucan), dextrins, cyclodextrin, but also sucrose, lactose and maltose. Suitable carbohydrates also include oxidized carbohydrates, for example carbohydrates in which some of the primary hydroxyl groups have been replaced, for example by carboxylic acid groups or by ammonium groups, either as natural products or as products from (bio)chemical oxidation of carbohydrates.

The invention also relates to an oxidized carbohydrate obtainable by the method described herein having a content of 0.05–0.85 dialdehyde functional groups per original monosaccharide unit, in particular if the carbohydrate is an $\beta$-1,4-glucan such as cellulose or a pentosan, such as inulin, xylan, levan. A content of 0.05–0.65 dialdehyde functional groups per original monosaccharide unit is preferred in case of $\alpha$-1,4-glucans, such as starch, and 0.2–0.85 dialdehyde functional groups per original monosaccharide unit in case of other carbohydrates such as dextrans. Most preferred are carbohydrates having an oxidation degree of 30–65%, i.e. a dialdehyde content of 0.3–0.65 per original monosaccharide unit.

The regeneration of the spent periodate, that is to say iodate and possible other oxidation states of iodine, such as iodide, obtained on oxidation thereof, takes place simultaneously with the oxidation reaction. Said regeneration can proceed by chemical means, for example using chlorine or hypochlorite, but is preferably carried out electrochemically.

Preferably, the regeneration is carried out in a chamber (cell) which is separate from the reaction chamber. A suitable electrolysis cell is known per se and consists of two compartments separated by a cation exchange membrane (e.g. Nafion® from Dupont, Neosepta® from Tokuyama Soda, Flemion® from Asahi Glass, Ionics® from Ionics Inc.). The anode material may be electrochemically deposited lead dioxide on inert material such as platinum, carbon, titanium or titanium oxide, or lead particles embedded in a polymer matrix. The cathode material can be platinum or stainless steel. Other electrode materials are equally usable. Usually a current density of 1.5–3 A/dm$^2$ is applied. The corresponding anode potential measured against a Ag/AgCl reference electrode is 1.7–1.8 V.

A filter or membrane is placed between the reaction chamber and the electrochemical cell, which filter or membrane is essentially permeable to the ionic compounds and impermeable to the carbohydrate. The materials for a membrane of this type are chosen depending on the carbohydrate, in particular the chain length thereof. Suitable materials for use with long-chain carbohydrates such as starch and inulin are, for example, poly(vinylidene fluoride), polyacrylonitrile and polysulfone.

It was found that a further improvement can be achieved by interposing, between the polysaccharide oxidation stage and the periodate regeneration stage, a stage wherein the solution to be regenerated containing periodate and iodate is subjected to electrodialysis.

In the electrodialysis cell a number of cation and anion exchange membranes are placed in an alternating pattern between a cathode and anode. For example Nafion® can be used as a cation exchange membrane and Tosflex® (from Tosoh) as an anion exchange membrane. The filtered solution from the oxidation reactor is fed to each electrodialysis compartment. Since only ions can migrate through the membrane, the ionic concentration will increase in alternating compartments, while neutral compounds like carbohydrates will remain in the diluate. The anions present in the concentrate are mainly iodate, periodate and formate. If the concentrate passes the positively charged electrode (anode potential e.g. 1.2 V), formate will be oxidized to carbon dioxide. Hence, the concentrate leaving the electrodialysis cell will be purified from formate. This is advantageous because formic acid, which is usually formed as a byproduct of the polysaccharide oxidation, was found to attack the lead dioxide anode used in the periodate regeneration cell. Consequently, iodate in the concentrate can be oxidized to periodate in the electrochemical cell at a lead dioxide electrode without interfering formate. Both diluent from the electrodialysis cell and regenerated concentrate from the electrochemical regeneration cell are recombined and pumped to the oxidation vessel. The combined process of iodate and periodate concentration, purification and regeneration can be performed simultaneously during polysaccharide oxidation.

When a batch of carbohydrate has been oxidized to the desired degree of oxidation, the reaction can be stopped by changing the feed of the electrodialysis cell. The oxidation liquor is pumped through the diluate chambers of the electrodialysis cell, and the regeneration solution is pumped through the concentrate cell, without recombination of the diluate and concentrate. This results in a decrease of the periodate/iodate concentration in the oxidation reactor, which can be compared with filtration and washing. The regeneration liquor is concentrated and purified from formate, while the iodate therein is oxidized to periodate.

EXAMPLE 1

Figure 1:
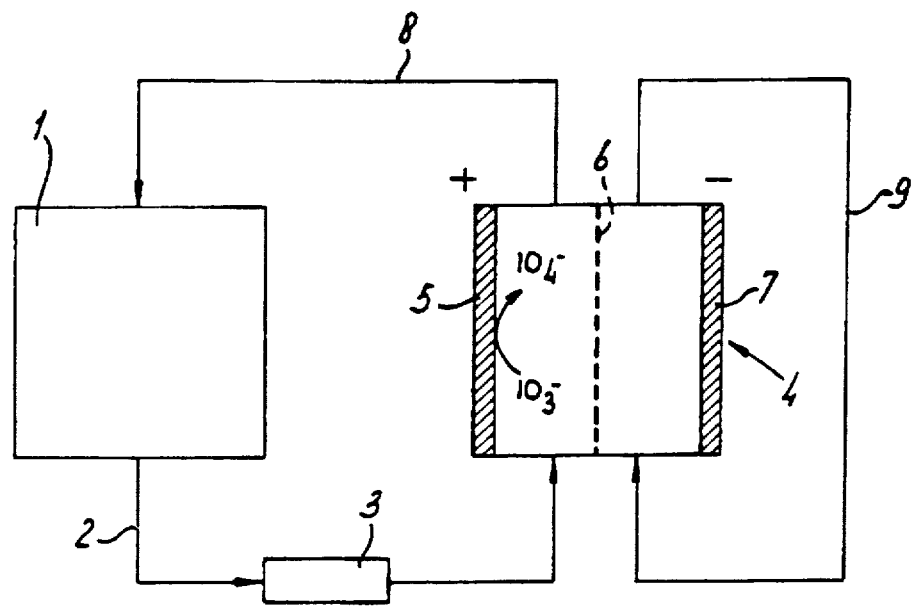
FIG. 1 represents an embodiment according to the invention wherein the oxidation reactor 1 is connected through line 2 and filter 3, which is substantially impermeable for carbohydrates, with regeneration cell 4, comprising a lead dioxide anode 5, a cation exchange membrane 6 and a cathode 7 and with return line 8. The catholyte may be recycled through line 9.
Figure 2:
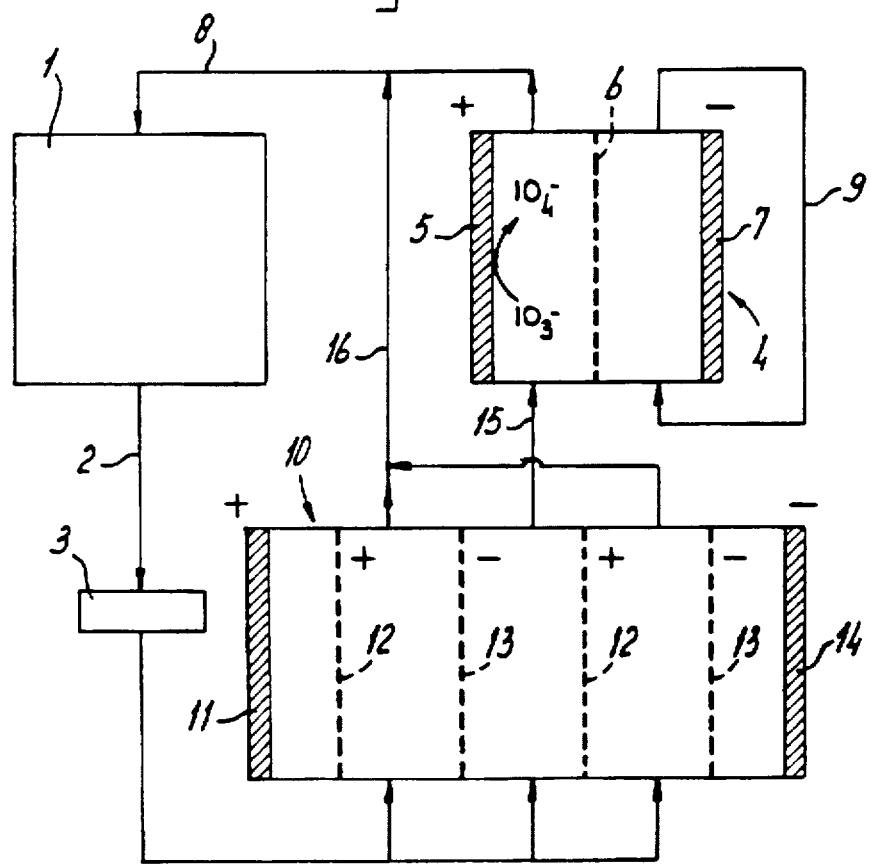
FIG. 2 represents another embodiment of the invention which, in addition to the parts described under FIG. 1, comprises an electrodialysis cell 10 comprising an anode 11, one or more anion exchange membranes 12, one or more cation exchange membranes 13 and a cathode 14. In this figure, the four membranes enclose a diluate compartment, a concentrate compartment and a diluate compartment. Line 15 connects the concentrate compartment(s) of cell 10 with the regeneration cell 4, and lines 16 connects the diluate compartments of cell 10 to reactor 1. Line 8 returns the regenerate of cell 4 to the reactor 1.
Figure 3:
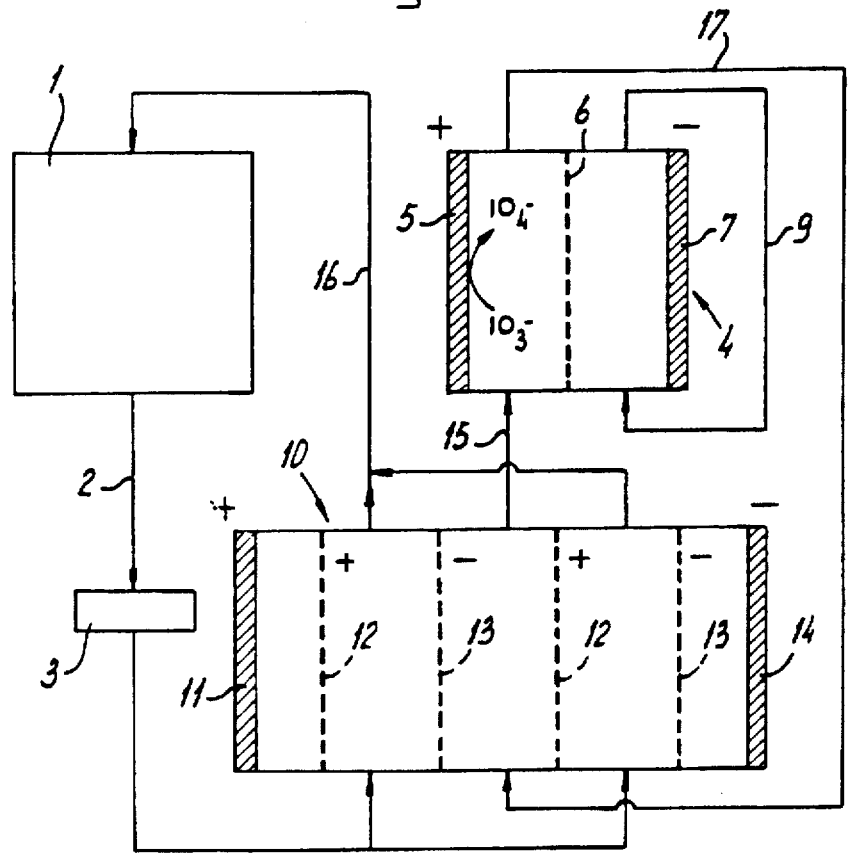
FIG. 3 represents a similar embodiment as FIG. 2, with the difference that the regenerate of cell 4 is fed through line 17 to the concentrate compartment of cell 10. This mode can be used when the oxidation is completed and the carbohydrate batches are exchanged.

Semi-continuous preparation of dialdehyde starch; oxidation and regeneration

Potato starch (Avebe, 162 g, 1 mol) is suspended in 1.6 l water and introduced into a 2.5 l reaction vessel. 21.4 g (0.1 mol) sodium metaperiodate (Merck) are added to the suspension. The solution obtained from the suspension is pumped into an electrolysis vessel via a membrane (polyacrylonitrile) which is impermeable to starch. The electrolysis vessel contains an anode plate consisting of a lead dioxide layer on titanium and a stainless steel cathode separated by a perfluorosulphonic acid cation exchanger (Nafion®) as separating membrane between anode space and cathode space. The electrodes, the membrane and turbulence promoters are assembled in a common framework. The catholyte solution (5% NaOH) is circulated through the catholyte chamber. The cell is operated at a current density of 2 A/dm². The regenerated periodate solution is continuously pumped back to the reaction vessel. At a current yield of 70%, a pH of 3 to 5 and a temperature of 25° C., a degree of oxidation (dialdehyde starch) of 50% is obtained after about half an hour, a degree of oxidation of 65% is obtained within one hour and a degree of oxidation of 95% is obtained after about 10 hours.

The degree of oxidation is determined by stopping the periodate reaction in a reaction sample and reducing the oxidation product by treatment with 0.8M sodium borohydride in 0.1M sodium hydroxide solution, followed by hydrolysis with sulphuric acid at elevated temperature. As a result of this treatment, oxidized anhydroglucose units yield erythritol and non-oxidized anhydroglucose units yield glucose, which products are determined quantitatively by means of HPLC.

The biodegradability of dialdehyde starch having a degree of oxidation of 50% obtained by this method has been determined. The rate of disappearance, determined using a modified Sturm test (ASTM D5209) and a two-phase (air/water) BOD test (NEN 6516) is twice as high as that of 100% dialdehyde starch.

EXAMPLE 2

Semi-continuous preparation of dialdehyde starch: oxidation, electrodialysis and regeneration The same procedure as described in example 1 is followed, with the exception that the oxidant solution is purified and concentrated in an electrodialysis unit prior to regeneration. The electrodialysis cell consists of a series of anion and cation exchange membrane pairs (Ionics®). All chambers are supplied with the same aqueous liquor from the oxidation reactor after filtration. Electrodialysis is performed at a current density of 1 A/dm². The concentrate is two times more concentrated than the feed solution. The concentrate is pumped to the regeneration cell where iodate is oxidized to periodate with a current density of 2.5 A/dm². At a current yield of 80% a degree of oxidation of 60% is obtained after half an hour. The dialdehyde starch solution is purified from iodic compounds by changing the feed solutions of the electrodialysis cell. When electrodialysis is stopped, 90% of the iodic compounds in the periodate form, are recovered form the oxidation solution in the regeneration solution.

EXAMPLE 3

Figure 4:
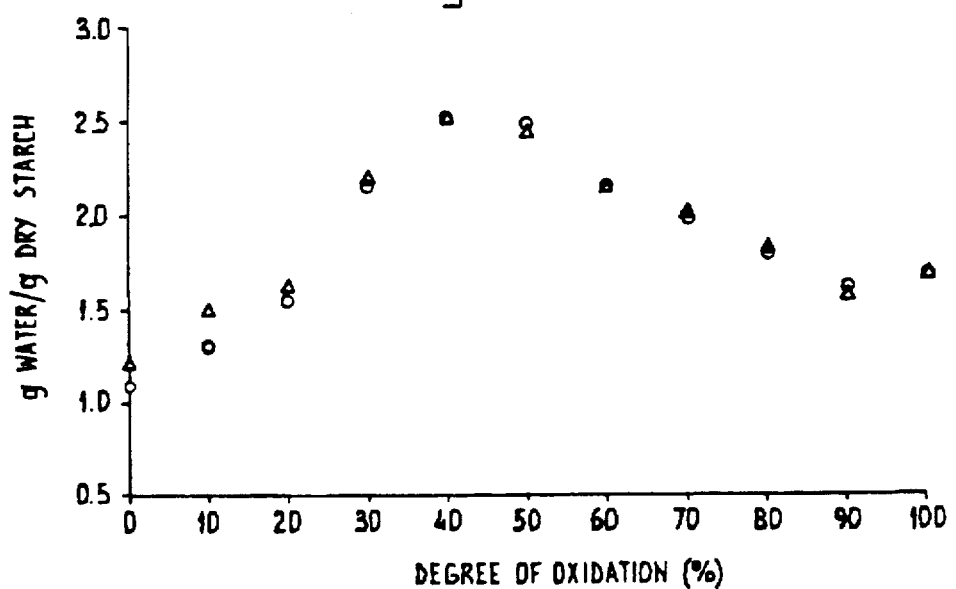
FIG. 4 shows the water absorption capacity of oxidized starch as a function of the degree of oxidation.

Three grams of dialdehyde starch and 25 ml deionised water (pH 4) were weighed in a plastic recipient. The suspension was stirred for 30 minutes and subsequently centrifuged. The supernatant was separated and the residue weighed. The water absorption was calculated as the mass of water absorbed over the initial mass of dry material. The results as a function of the degree of oxidation are represented in FIG. 4. The absorbed water content varied from 1.2 to 1.4 g water per g dry starch with a maximum at 40 to 50% oxidation.

We claim:

1. A process for the oxidation of carbohydrates selected from disaccharides, oligosaccharides and polysaccharides possessing a glycol difunctional group, using a less than equivalent amount of periodate in an aqueous medium, comprising the steps of oxidizing the carbohydrates in a first chamber, concurrently regenerating the periodate continuously during the oxidation in a second reaction chamber, separate from the first chamber, and continuously feeding the regenerated periodate back to the first chamber during the oxidizing step, whereby the regenerated periodate is reused in the oxidizing step.

2. The process of claim 1, wherein the second chamber in which the periodate is regenerated is separated by means of semi-permeable wall from the first chamber in which the carbohydrate is oxidized.

3. The process of claim 1, wherein the periodate is regenerated electrochemically.

4. The process of claim 3, wherein, before the periodate is regenerated, the solution containing periodate reaction products is subjected to electrodialysis.

5. The process of claim 1, wherein 0.05–0.25 mol periodate is used per mole of monosaccharide unit.

6. The process of claim 1, wherein the carbohydrate is oxidized to a content of 0.05–0.85 dialdehyde functional groups per original monosaccharide unit.

7. The process of claim 6, wherein the carbohydrate is a glucan with a majority of $\alpha$-1.4 bonds, and is oxidized to a content of 0.05–0.65 dialdehyde functional groups per original monosaccharide unit.

8. A process for the oxidation of carbohydrates selected from disaccharides, oligosaccharides and polysaccharides possessing a glycol difunctional group, using a less than equivalent amount of periodate in an aqueous medium, comprising the concurrent steps of regenerating the periodate during oxidation of the carbohydrates in the substantial absence of the carbohydrates, and continuously feeding the regenerated periodate back to the oxidation reaction during oxidation of the carbohydrates.

9. The process of claim further comprising the steps of oxidizing the carbohydrates in a first chamber and regenerating the periodate in a second chamber separate from the first chamber.

10. An oxidized carbohydrate, the carbohydrate being selected from β-1,4-glucans, α-1,6-glucans, fructans, mannans, galactans, chitins, pentosans, gums and fractions thereof, said oxidized carbohydrate containing 0.2–0.65 dialdehyde functional groups per original monosaccharide unit.

11. An oxidized polysaccharide containing 0.3–0.65 dialdehyde functional groups per original monosaccharide unit.

* * * * *